(12) United States Patent
Rossby et al.

(10) Patent No.: US 6,814,180 B1
(45) Date of Patent: Nov. 9, 2004

(54) MONOPOLE-DRIVEN UNDERWATER SOUND SOURCE

(75) Inventors: Hans Thomas Rossby, Saunderstown, RI (US); James H. Miller, Kingston, RI (US)

(73) Assignee: The Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

(21) Appl. No.: 10/054,206

(22) Filed: Jan. 22, 2002

Related U.S. Application Data

(60) Provisional application No. 60/263,430, filed on Jan. 23, 2001.

(51) Int. Cl.[7] .................................................. G01V 1/38
(52) U.S. Cl. ....................... 181/120; 181/118; 367/141; 367/171
(58) Field of Search .......................... 310/337; 367/141, 367/142, 174, 176, 171, 166, 169; 181/118, 120

(56) References Cited

U.S. PATENT DOCUMENTS

| | | | | |
|---|---|---|---|---|
| 3,319,220 A | * | 5/1967 | Massa, Jr. | 367/151 |
| 3,706,967 A | * | 12/1972 | Renna, Jr. | 367/159 |
| 3,716,827 A | * | 2/1973 | Massa | 310/337 |
| 4,855,964 A | * | 8/1989 | Fanning et al. | 310/337 |
| 4,922,470 A | * | 5/1990 | McMahon et al. | 367/174 |
| 5,926,439 A | * | 7/1999 | Piquette | 310/337 |
| 5,949,741 A | * | 9/1999 | Piquette | 310/337 |

OTHER PUBLICATIONS

An Efficient Sound Source for Wide–Area RAFOS Navigation, T. Rossby, J. Ellis, D.C. Webb, Journal of Atmospheric and Oceanic Technology, vol. 10, No. 3, Jun. 1993.

* cited by examiner

Primary Examiner—Ian J. Lobo
(74) Attorney, Agent, or Firm—Gauthier & Connors LLP

(57) ABSTRACT

An underwater sound source which comprises a housing having an inner and an outer surface and a monopole driver suspended within the center of the housing. The housing is adapted to receive fluid therein to form a fluid column inside the housing. The underwater sound source resonates at a frequency of 260 Hz when the monopole driver excites the fluid column.

16 Claims, 3 Drawing Sheets

MONOPOLE-DRIVEN UNDERWATER SOUND SOURCE

CROSS-REFERENCE TO RELATED APPLICATIONS

This application claims the benefit of U.S. Provisional Application No. 60/263,430, filed Jan. 23, 2001.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. 9811289 awarded by Ocean Science Division at the National Science Foundation (OCE).

BACKGROUND OF THE INVENTION

1. Field of the Invention

This invention relates to underwater sound sources and more particularly to underwater sound sources having applications for RAFOS navigation and acoustic telemetry.

2. Description of the Related Art

The deep sound channel or SOFAR channel has been in use since the early 1970's to study ocean circulation in a number of studies in the Atlantic and Pacific oceans. Early studies used neutrally buoyant floats, so-called SOFAR floats, which were tracked from land-based hydrophones, and later from moored listening stations. With advances in low-power microprocessors, it became possible to miniaturize the electronics considerably, permitting the reversal of the mode of tracking such that the sound sources became stationary, and the receivers the drifters. This step allowed for a considerable reduction in system cost This reversal of acoustics was coined in the acronym RAFOS (SOFAR spelled backwards). As of today RAFOS floats have been used in studies in both hemispheres of the Atlantic and the Pacific, and most recently around South Africa. Although the advances in technology reduced some aspects of the cost of manufacturing RAFOS floats, a continuing need still exists to further reduce the costs associated with the manufacture of an underwater sound source that can not only be used in RAFOS navigation but also acoustic telemetry. The present invention addresses this need.

BRIEF SUMMARY OF THE INVENTION

Broadly, the invention includes an underwater sound source comprising a housing having an inner and outer surface, two apertures and a monopole driver positioned within the housing. The housing is adapted to be flooded with fluid to form a fluid column inside the housing. The underwater sound source resonates when the monopole driver excites the fluid column. In a preferred embodiment, the monopole driver is a spherical monopole and the length of the housing is in the range of between about 1.5 to 2.5 meters, preferably about 2.0 meters. The length of the housing determines the frequency at which the underwater sound source resonates.

In one aspect of the invention, the length of the housing is about 2.0 meters and the underwater sound source resonates at a frequency of about 260 Hz.

In another aspect of the invention, the underwater sound source resonates when excited by the monopole driver at a frequency within the range of between 200 to 1000 Hz, preferably 260 Hz. The frequency at which underwater sound source resonates is determined by the length of the pipe.

In yet another aspect of the invention, the underwater sound source has a spherical piezoelectric monopole suspended within the center of the housing. The underwater sound source resonates at a frequency of 260 Hz when excited by the monopole.

The housing of the underwater sound source can be cylindrical and typically comprises a free-flooded pipe. The pipe can be comprised of metal, such as aluminum, or a polymer, such as polyvinyl chloride. The housing further comprises an electronics module having a power source positioned on the outer surface of the housing. The electronics module communicates with the monopole driver.

In yet another aspect of the invention, the electronics module is positioned above an open end of the pipe.

BRIEF DESCRIPTION OF THE DRAWINGS(S)

DESCRIPTION OF THE PREFERRED EMBODIMENT(S)

Figure 1:
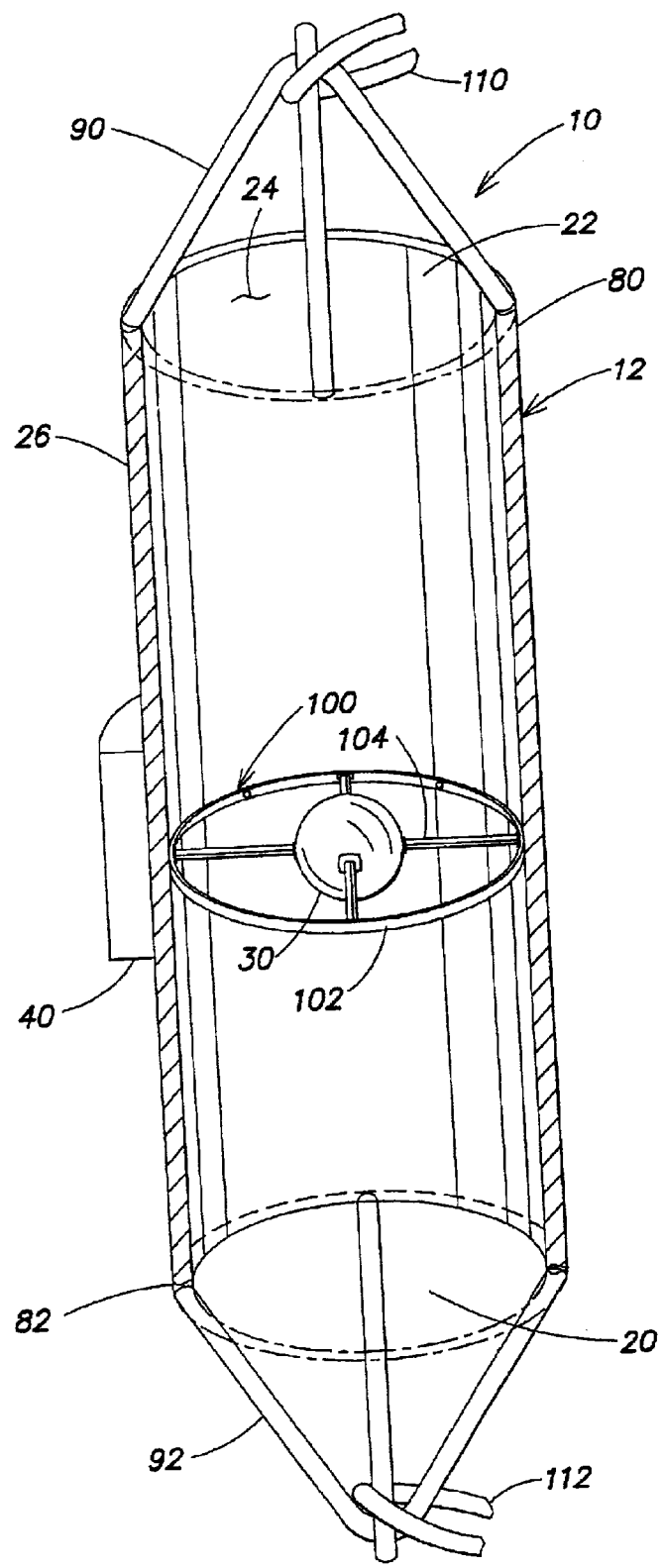
FIG. 1 is a front sectional perspective view of an embodiment of the invention.

Referring to FIG. 1, an underwater sound source 10 is shown comprising a housing 12. In a preferred embodiment, the housing 12 is a cylindrical free flooded metal pipe or tube having a length of about 2.0 meters and a wall thickness of about 0.64 cm. The diameter of the housing can be 0.45 m. The housing 12 has two apertures 20 (shown in phantom) and 22, an inner surface 24 and an outer surface 26, a top end 80 and a bottom end 82.

Positioned within the housing 12 is a spherical monopole driver 30. A harness 90 is coupled to the top end 80 and a harness 92 is coupled to the bottom end 82. The harnesses can be constructed of chain or rope. A support ring 100 having a perimeter 102 is attached, e.g. bolted, to the inside surface 24 of the housing 12. Four equally spaced spokes 104 attached to the perimeter 102 extend inwardly toward the center of the housing 12 and are secured to the spherical monopole 30 thereby suspending the spherical monopole within the center of the housing 12.

In an alternative embodiment (not shown), two sets of two adjacent spokes converge forming two triangles, the apexes of which attach to the spherical monopole 30.

Figure 2:
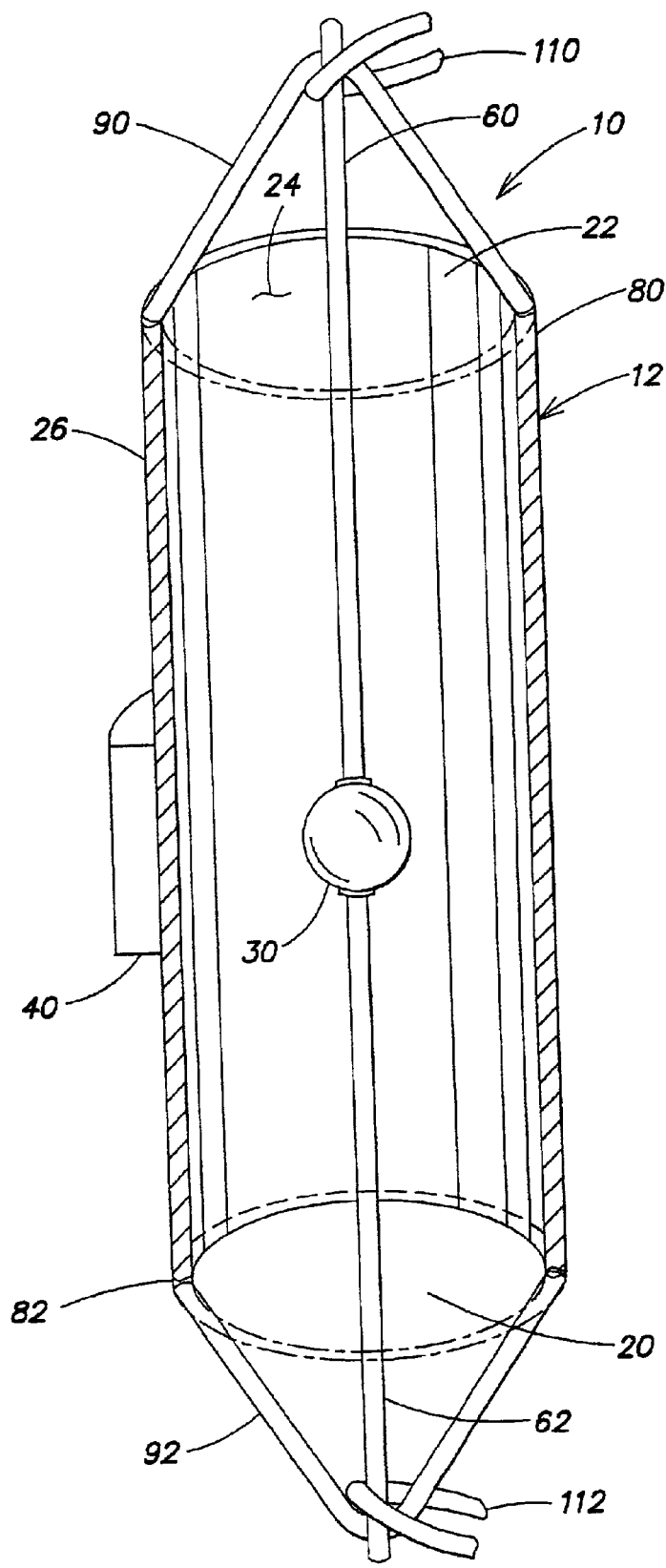
FIG. 2 is a front sectional perspective view of an alternative embodiment of the invention.

Referring to FIG. 2, in an alternative embodiment, the spherical monopole driver 30 can be suspended within the center of the housing by vertical supports 60 and 62. Vertical support 60 can be secured to the harness 90 and vertical support 62 can be secured to the harness 92. The vertical supports can be constructed of wire, chain or rope.

Referring to FIGS. 1 and 2, a first mooring line 110 is fastened to the harness 90 and a second mooring line 112 is fastened to harness 92 wherein a weight can be affixed to the end of the first mooring line and a float can be affixed to the end of the second mooring line or vice versa. An electronics module 40 having a power source therein, such as a battery, is attached to the exterior surface 24 by conventional methods, such as strapping.

In an alternative embodiment, the electronics module 40 can also be positioned above either of the apertures 22 or 20

(not shown). The electronics module 40 is in communication with the spherical monopole 30. The spherical monopole 30 and electronics module 40 are well-known in the art and need not be described in detail. Wires (not shown), trailed against the outer surface 26 and inner surface 24 of the housing 12 or, in an alternative embodiment, inserted through the housing 12, can connect the electronics module 40 to the spherical monopole 30. The housing 12 is adapted to receive fluid, such as seawater, therein to form a fluid column. For example, as the housing 12 is lowered into the ocean, seawater floods the housing 12 to form a seawater column inside the housing 12. The spherical monopole 30, activated by the electronics module 30, excites the seawater column inside the housing 12 and the underwater sound source 10 resonates at a frequency determined by the length of the housing.

Figure 3:
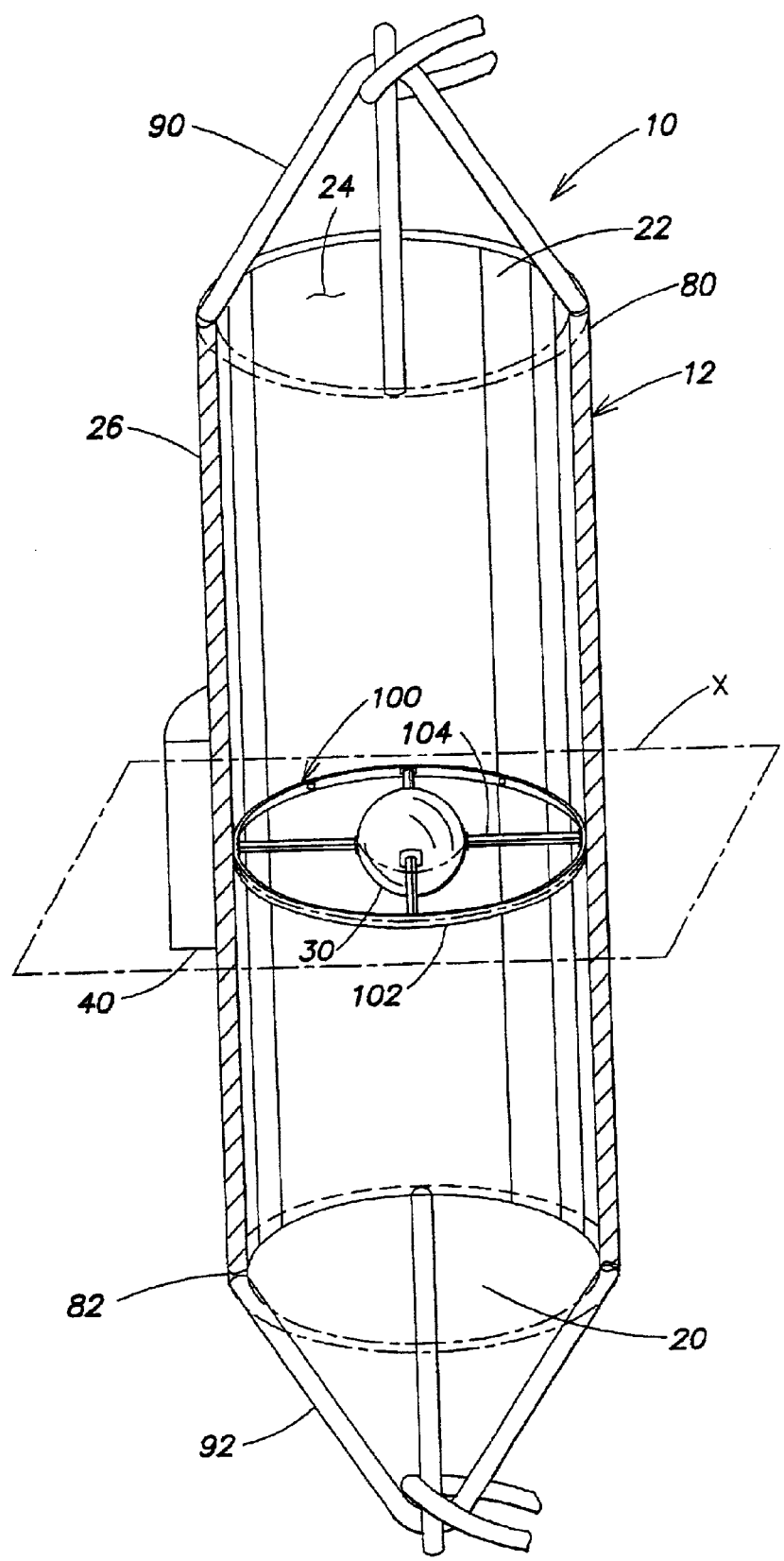
FIG. 3 is a front sectional perspective view of another alternative embodiment of the invention.

Referring to FIG. 3, in one embodiment, the housing 12 has an equatorial plane X. The ring support 100, spokes 104 and spherical monopole 30 lie in the equatorial plane.

In addition to spherical monopoles, other suitable monopole drivers can include, capped-off ring transducers, and piston devices separating two parallel plates. The monopole driver does not require very much piezoelectric material to provide an adequate sound pressure level, and hence its fabrication cost can be kept small. In a preferred embodiment, the monopole driver has an electro-acoustic conversion efficiency within the range of between about 35 to 67%, preferably about 50%.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. An underwater sound source which comprises:
   a housing having a length L along its longitudinal axis, the length L being perpendicular to a plane which bisects the housing, the housing being adapted to receive fluid therein to form a fluid column inside the housing; and
   a monopole driver positioned within the plane and inside the housing, the underwater sound source resonating when the monopole driver excites the fluid column.

2. The underwater sound source according to claim 1 wherein the underwater sound source resonates at a frequency within the range of 200 to 1000 Hz.

3. The underwater sound source according to claim 2 wherein the underwater sound source resonates at a frequency of about 260 Hz.

4. The underwater sound source according to claim 1 wherein the monopole driver is a spherical monopole.

5. The underwater sound source according to claim 4 wherein the housing is cylindrical.

6. The underwater sound source according to claim 5 wherein length L is about 2.0 meters.

7. The underwater sound source according to claim 1 which further comprises an electronics module.

8. The underwater sound source according to claim 7 wherein the electronics module is positioned on the outside of the housing.

9. The underwater sound source according to claim 4 wherein the monopole driver has an electro-acoustic conversion efficiency of about 50%.

10. The underwater sound source according to claim 5 wherein the housing is a steel pipe.

11. The underwater sound source according to claim 10 wherein the fluid is seawater.

12. The underwater sound source according to claim 5 which further comprises:
    means for positioning the spherical monopole within the plane and inside the housing.

13. The underwater sound according to claim 12 wherein the housing has an inner surface and the means for positioning comprises:
    a support secured to the inner surface;
    at least one spoke extending from the support, the member being secured to the spherical monopole.

14. The underwater sound source of claim 13 wherein the support is a ring support having a perimeter.

15. The underwater sound source of claim 14 which further comprises: at least four equally spaced spokes attached to the ring support, the spokes being secured to the spherical monopole.

16. An underwater sound source which comprises:
    a housing having a length L along its longitudinal axis, the length L being perpendicular to a plane which bisects the housing, the housing being adapted to receive fluid therein to form a fluid column inside the housing; and
    a monopole driver positioned within the plane and inside the housing, the fluid column being excited when the monopole driver is actuated.

* * * * *